United States Patent [19]

Meiser et al.

[11] 3,903,287

[45] Sept. 2, 1975

[54] IMIDAZOLYL KETONES FOR TREATING MYCOTIC INFECTIONS

[75] Inventors: Werner Meiser; Karl Heinz Buchel; Manfred Plempel, all of Wuppertal-Elberfeld, Germany

[73] Assignee: Bayer Aktiengesellschaft, Germany

[22] Filed: Oct. 1, 1973

[21] Appl. No.: 402,050

Related U.S. Application Data

[62] Division of Ser. No. 219,556, Jan. 20, 1972, Pat. No. 3,812,142.

[30] Foreign Application Priority Data

Feb. 5, 1971 Germany.............................. 2105490

[52] U.S. Cl. ................................................ 424/273
[51] Int. Cl. ........................................... H61k 27/00
[58] Field of Search ..................................... 424/273

Primary Examiner—Jerome D. Goldberg

[57] ABSTRACT

Imidazole derivatives of alkyl, cycloalkyl or aryl ketones are antimycotic agents. The compounds, of which 1-imidazolyl-1-(4'-chlorophenoxy)-3,3-dimethylbutan-2-one is a typical embodiment, can be obtained from the corresponding hydroxy or halo ketone through treatment with imidazole.

74 Claims, No Drawings

IMIDAZOLYL KETONES FOR TREATING MYCOTIC INFECTIONS

This is a division of application Ser. No. 219,556 filed Jan. 20, 1972, which issued as Pat. No. 3,812,142 on May 21, 1974.

DETAILED DESCRIPTION

The present invention relates to new imidazole derivatives and salts thereof, to processes for their preparation, to the use thereof and to pharmaceutical compositions. In particular, this invention provides imidazole derivatives of the formula:

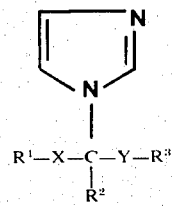

wherein $R^1$ is an optionally substituted lower alkyl, lower alkenyl, lower alkynyl, cycloalkyl, cycloalkenyl, aryl or lower aralkyl group;

$R^2$ is hydrogen or an optionally substituted lower alkyl, lower alkenyl, lower alkynyl, cycloalkyl, cycloalkenyl, aryl or lower aralkyl group;

$R^3$ is an optionally substituted lower alkyl, lower alkenyl, lower alkynyl, cycloalkyl, cycloalkenyl, aryl or lower aralkyl group;

X is an oxygen or sulfur atom; and

Y is a keto group or a functional derivative of a keto group, and the salts thereof.

These compounds and their salts are valuable antimycotic agents, as is described in greater detail below.

Within this class, a preferred subclass are those compounds of the formula:

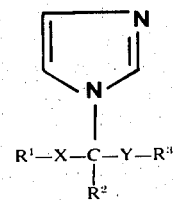

wherein each of $R^1$ and $R^3$ is lower alkyl, phenyl or phenyl substituted by from one to three members selected from the group consisting of halogen, lower alkyl, lower alkoxy, lower alkylthio, trifluoromethyl, nitro, cyano, lower alkylsulfonyl, lower alkylsulfinyl, or phenyl $R^2$ is hydrogen, lower alkyl, phenyl or phenyl substituted by one to three members selected from the group consisting of halogen, lower alkyl, lower alkoxy, lower alkylthio, trifluoromethyl, nitro, cyano, lower alkylsulfonyl, lower alkylsulfinyl or phenyl;

X is —O— or —S—, and

Y is —CO— or —C(OH)$_2$— and the non-toxic salts thereof.

The term lower alkyl denotes a univalent saturated branched or straight hydrocarbon chain containing from 1 to 8 carbon atoms. Representative of such lower alkyl groups are thus methyl, ethyl, propyl, isopropyl, butyl, isobutyl, sec.butyl, tert.butyl, pentyl, isopentyl, neopentyl, tert.pentyl, hexyl, and the like.

The term lower alkenyl denotes a univalent branched or straight hydrocarbon chain containing from 2 to 8 carbon atoms and nonterminal ethylenic unsaturation as, for example, vinyl, allyl, isopropenyl, 2-butenyl, 3-methyl-2-butenyl, 2-pentenyl, 3-pentenyl, 2-hexenyl, 4-hexenyl, and the like.

The term lower alkynyl denotes a univalent branched or straight hydrocarbon chain containing from 2 to 8 carbon atoms and nonterminal acetylenic unsaturation as, for example, ethynyl, 2-propynyl, 4-pentynyl, and the like.

The term cycloalkyl denotes a univalent saturated monocyclic hydrocarbon of from 3 to 7 carbon atoms as, for example, cyclopropyl, cyclobutyl, cyclopentyl, cyclohexyl, and cycloheptyl.

The term lower alkyloxy denotes a straight or branched hydrocarbon chain bound to the remainder of the molecule through an ethereal oxygen atom as, for example, methoxy, ethoxy, propoxy, isopropoxy, butoxy, isobutoxy, pentoxy and hexoxy.

The term lower alkylthio denotes a branched or straight hydrocarbon chain bound to the remainder of the molecule through a divalent sulfur as, for example, methylthio, ethylthio, propylthio, isopropylthio, butylthio, and the like.

The term halogen denotes the substituents fluoro, chloro, bromo and iodo, especially chloro or bromo.

Aryl denotes an aromatic ring system of 6 or 10 carbon atoms such as phenyl or naphthyl. Lower aralkyl denotes such an aryl group bound through a lower alkyl group, such as benzyl, phenethyl or naphthylmethyl.

As indicated, the present invention also pertains to the physiologically acceptable non-toxic acid addition salts of these basic compounds. Such salts include those derived from organic and inorganic acids such as, without limitation, hydrochloric acid, hydrobromic acid, phosphoric acid, sulfuric acid, methane sulphonic acid, acetic acid tartaric acid, lactic acid, succinic acid, citric acid, malic acid, maleic acid, sorbic acid, aconitic acid, salicylic acid phthalic acid, embonic acid, enanthic acid, and the like.

A most preferred class of compounds are those of formula IA wherein each of $R^1$ and $R^3$ is lower alkyl, biphenylyl, phenyl or phenyl substituted by up to three halogen atoms and $R_2$ is hydrogen, lower alkyl, phenyl or phenyl substituted by up to 3 halogen atoms.

Typical of these preferred compounds are:

1. [ω-Imidazolyl]-[ω-2′,6′-dichlorophenoxy]-acetophenone
2. [ω-Imidazolyl]-[ω-2′-chlorophenoxy]-acetophenone
3. 1-Imidazolyl-1-(4′-chlorophenoxy)-3,3-dimethylbutan-2-one
4. [ω-Imidazolyl]-[ω-2′,4′,5′-trichlorophenoxy]-acetophenone
5. [ω-Imidazolyl]-[ω-2′,4′-dichlorophenoxy]-4-chloroacetophenone
6. [ω-Imidazolyl]-[ω-4′-chlorophenoxy]-acetophenonehydrate
7. [ω-Imidazolyl]-[ω-2′,4′-dichlorophenoxy]-acetophenonehydrate
8. [ω-Imidazolyl]-[ω-3′-chlorophenoxy]-acetophenonehydrate 9. ω-Imidazolyl]-[ω-2'-chlorophenoxy]-acetophenonehydrate
10. [ω-Imidazolyl]-[ω-phenyl]-[ω-4'-chlorophenoxy]-acetophenone
11. [ω-Imidazolyl]-[ω-3'-chlorophenoxy]-acetophenone
12. 1-Imidazolyl-1-(2',6'-dichlorophenoxy)-3,3-dimethylbutan-2-one
13. 1-Imidazolyl-1-(2',5'-dichlorophenoxy)-3,3'-dimethylbutan-2-one
14. 1-Imidazolyl-1-(2',4'-dichlorophenoxy)-3,3-dimethylbutan-2-one
15. 1-Imidazolyl-1-(2'-chlorophenoxy)-3,3-dimethylbutan-2-one
16. [ω-Imidazolyl]-[ω-methyl]-[ω-4'-chlorophenoxy]-acetophenone
17. 1-Imidazolyl-1-phenoxy-3,3-dimethylbutan-2-one
18. 1-Imidazolyl-1-(4'-chlorphenylthio)-3,3-dimethylbutan-2-one
19. [ω-Imidazolyl]-[ω-4'-chlorophenylthio]-acetophenone
20. 1-Imidazolyl-1-(4'-bromophenoxy)-3,3-dimethylbutan-2-one, and
21. 1-Imidazolyl-1(4-biphenylyloxy)-3,3-dimethylbutan-2-one.
22. 1-Imidazolyl-1-(4'-fluorophenoxy)-3,3'-dimethylbutan-2-one
23. 1-Imidazolyl-1-(4'-nitrophenoxy)-3,3-dimethylbutan-2-one
24. 1-Imidazolyl-1-(2'-biphenylyloxy)-3,3-dimethylbutan-2-one
25. 1-Imidazolyl-1-(6-chloro-2-biphenylyloxy)-3,3-dimethylbutan-2-one
26. 1-Imidazolyl-1-(4'-ter.butylphenoxy)-3,3-dimethylbutan-2-one
27. ω-Imidazolyl-ω-phenoxyacetophenone
28. 1-Imidazolyl-1-(2',4'-dichlorophenoxy)-1-phenyl-3,3-dimethylbutan-2-one
29. 1-Imidazolyl-1-(4'-chlorophenoxy)-1-phenyl-3,3-dimethylbutan-2-one
30. 1-Imidazolyl-1-phenoxy-1-phenyl-3,3-dimethylbutan-2-one
31. 1-Imidazolyl-1-(4'-chlorophenoxy)-1-methyl-3,3-dimethylbutan-2-one Particularly preferred compounds are 1-imidazolyl-1-(4'-chlorophenoxy)-3,3-dimethylbutan-2-one and [ω-imidazolyl]-[ω-4'-chlorophenoxy]-acetophenone, the hydrates thereof and the salts thereof, especially the hydrochlorides.

The compounds of the present invention are prepared by treating a compound of the formula:

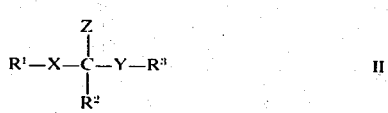

II in which $R^1$, $R^2$, $R^3$, X and Y are as defined above and Z is hydroxy or halogeno, preferably chloro or bromo, with imidazole. Alternatively when Z is hydroxy, a thionylbisimidazole or carbonylbisimidazole can be employed.

In the first embodiment a halo compound of the formula:

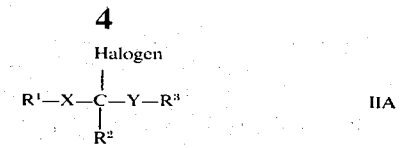

IIA is treated with imidazole in the presence of an acid-binding agent. Generally the acid-binding agent is an appropriate excess of the imidazole reactant but it is also possible to employ other acid-binding agents, such as lower tertiary alkylamines or aralkylamines, e.g. triethylamine or dimethylbenzylamine. The reaction temperatures can be varied over a substantial range but in general, the process is carried out at from about 20° to about 150°C, preferably at 80° to 120°C. About 1 mol of imidazole and about 1 mol of acid-binding agent are employed per mol of the halogeno compound of formula IIA.

Suitable diluents for this reaction are generally polar organic solvents, such as nitriles, e.g. acetonitrile; sulfoxides, e.g. dimethylsulfoxide; formamides, e.g. dimethylformamide; ketones, e.g. acetone; ethers, e.g. diethyl ether and tertahydrofuran; nitroalkanes, e.g. nitromethane; and unsymmetrical chlorinated hydrocarbons, e.g. methylene chloride and chloroform.

In the second embodiment of this process, a hydroxy compound of the formula:

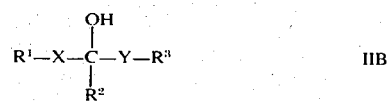

IIB is treated with imidazole under dehydration conditions, i.e. at elevated temperatures or in the presence of a dehydrating agent.

Suitable diluents include all inert high-boiling organic solvents, such as aromatic hydrocarbons, e.g. xylene; or halogenated aromatic hydrocarbons, e.g. chlorobenzene. The water produced can be removed azeotropically by means of these solvents. The reaction can also be carried out without any solvent, as for example in the melt. It is also possible to add one or more dehydrating agents, preferably alkaline earth oxides, such as for example magnesium oxide, barium oxide, calcium oxide or aluminum oxide, to facilitate the dehydration. The reaction temperature can be varied over a substantial range but in general, the reaction is carried out at from about 100° to 230°C, preferably between 140° and 200°C, and most preferably between 170° to 190°C. In the presence of a solvent, the reaction is conveniently conducted at the boiling point of the particular solvent. Preferably 1 to 2 mols of imidazole and optionally 1 to 3 moles of the dehydrating agent are employed per mol of the hydroxy compound of formula IIB.

In the third embodiment of this process, a hydroxy compound of formula IIB is treated with thionylbisimidazole or carbonylbisimidazole, generally in the presence of a solvent. Suitable solvents include aromatic hydrocarbons, as for example, benzene and toluene; ethers, as for example, diethyl ether and tetrahydrofuran; chlorinated hydrocarbons, as for example, methylene chloride, chloroform and carbon tetrachloride; and lower alkylnitriles, for example, acetonitrile. The reaction temperatures can be varied over a substantial range but in general, the reaction is conducted at from about 0° to 120°C, preferably between 20° and 100°C. Approximately equimolar amounts of reactants are employed.

Isolation and purification of the products of the above embodiments of this process can be effected utilizing standard techniques.

The compounds of the present invention can exist as optical isomers and both the racemates of these isomers and the individual isomers themselves are within the scope of the present invention. The racemates can be separated into their individual isomers through the well known technique and forming diastereoisomeric salts with optically active acids.

The starting materials of formulas IIA and IIB are known or can be conveniently prepared by known methods. Thus for example, an α-haloketone can be treated with an appropriate alcohol or mercaptan of the formula R¹XH and the product then halogenated to yield the reactant of formula IIA. Compounds of formula IIB can be obtained from the corresponding halo compounds or through treatment of an α,β-diketone or α-ketoaldehyde of the formula R³COCOR² with an alcohol or mercaptan of the formula R¹XH.

The compounds of the invention show strong antimycotic action. They display a broad spectrum of action, for example, against yeasts, e.g. Candida and Cryptococcus; molds, e.g. Aspergillus; and dermatophytes, e.g. Trichophyton, Microsporon and Epidermophyton. They are accordingly useful in human and veterinary medicine in the treatment of dermatomycoses and systemic mycoses caused by *Trichophyton mentagrophytes* and other varieties of Trichophyton, varieties of Microsporon, *Epidermophyton floccosum*, blastomyces and biphase fungi, and molds, especially those mycoses of the above organisms.

The antimycotic activity of the present compounds can be conveniently observed in well known in vitro and in vivo laboratory models.

The minimal inhibitory concentration (MIC) for various species of fungi can be determined by the serial dilution technique. A suitable nutrient media for dermatophytes and mold fungi is Sabouraud's milieu d'epreuve while for blastomyces and biphasic fungi, meat broth/glucose broth media can be employed. Incubation at 28°C is carried out for from 48 to 96 hours, and the growth read daily. Typical results are as follows:

Table 1

| Compound | MIC in γ/ml of nutrient medium in the case of | | | | |
|---|---|---|---|---|---|
| | Trichophyton mentagrophytes | Candida albicans | Microsporon felineum | Aspergillus niger | Penicillium comune |
| 1 | 4 | 4 | 40 | 100 | 100 |
| 2 | <1 | 4 | <1 | 4 | 100 |
| 3 | <1 | <1 | 4 | <1 | 40 |
| 4 | <1 | 4 | 100 | 40 | 100 |
| 4 Hydrochloride | | | | | |
| 4 Nitrate | 1 | 4 | 40 | 100 | 40 |
| 5 | <1 | 1 | 100 | 40 | 100 |
| 6 | <1 | 1 | 40 | 4 | 40 |
| 7 | <1 | 1 | 40 | 4 | 40 |
| 8 | 4 | 4 | 40 | 40 | 100 |
| 9 | 1 | 10 | 40 | 40 | 100 |
| 10 | 10 | 10 | 40 | 10 | 100 |
| 11 | 4 | 10 | 40 | 40 | 100 |
| 12 | <1 | 10 | 40 | 100 | 100 |
| 13 | <1 | 40–100 | 10 | >100 | >100 |
| 14 | <1 | 10 | 10 | 40 | 40 |
| 15 | <1 | 10 | 4 | 100 | 100 |

1. Experimental candidosis of white mice.

White mice, CF₃-SPF strain, fed on pellet fodder and water ad libitum, are intravenously infected, in the vein of the tail, with $1 - 2 \times 10^6$ cells of *Candida albicans*. Untreated animals die of the infection in 3 to 6 days following infection. If, starting on the day of infection and continuing up to the 5th day following infection, the compounds of the present invention are administered twice daily orally by means of the oesophagal probe in doses of 50 mg/kg of body weight to 125 mg/kg of body weight, significant increases in survival rates are observed. Thus for example with compounds 1, 6 and 8, 15 to 18 animals of each batch of 20 mice thus treated survived on the 6th day post infection, whereas of 20 untreated control animals, only 2 or 3 animals survived on the 6th day post infection. Parenteral administration produces similar results at lower doses. Hence when compound No. 1 is thus administered once intraperitoneally at doses of 25 to 50 mg/kg of body weight one hour before infection with Candida, 16 out of 20 animals survived for more than 6 days. Of 20 untreated control animals, only 2 or 3 animals survived on the 6th day after infection.

2. Experimental trichophytia of mice due to *Trichophyton quinckeanum*.

Male SPF-CF white mice weighing 20 to 22 g are infected on their shorn non-scarified backs with a suspension of spores of *Trichophyton quinckeanum*. Within 2 days following infection, a typical dermatomycosis developed at the point of infection with formation of characteristic multiple scutula. If the compounds of the present invention are administered orally in doses of $2 \times 25$ to 100 mg/kg of body weight from the day of infection up to 12 days post infection, 1 to 2 animals of the 20 treated animals show multiple scutula, while 18 to 19 animals of 20 control animals show multiple scutula.

In addition to the antimycotic action, the compounds of the invention also possess action against pathogenic protozoa, such as trypanosomes, trichomonades, *Entamoeba histolytica*, plasmodia and the like, as well as an action against Gram positive and Gram negative bacteria, such as Staphylococci and *Escherichia coli*.

The present invention also provides antimycotic pharmaceutical compositions containing as an active ingredient at least one of the compounds of the invention, generally in an amount of from 0.5 to 95% by weight, in admixture with a pharmaceutically acceptable solid or liquid diluent or carrier. Such pharmaceutical compositions include ointments, pastes, gels, creams, sprays, aerosols, lotions, aqueous and non-aqueous suspensions and solutions, elixirs, syrups, granules and powders, either free-flowing or compressed into tablets, capsules and suppositories.

The expression "pharmaceutically acceptable diluent or carrier" denotes a non-toxic substance which when mixed with the active ingredient renders it more suitable for administration. Examples of solid, liquid, and semi-solid diluents and carriers include water, non-toxic organic solvents, such as paraffins or petroleum fractions; vegetable oils such as groundnut oil and sesame oil; alcohols such as ethyl alcohol or glycerol; glycols such as propylene glycol or polyethylene glycol; natural rock powders such as kaolins, aluminas, talc or chalk; synthetic rock powders such as highly disperse silica and silicates; sugars such as unrefined sugar, lactose and glucose and the like.

Diluents used in pharmaceutical composition include fillers and extenders such as starch, sugars, mannitol, and silicic acid; binding agents such as carboxymethyl cellulose and other cellulose derivatives, alginates, gelatine and polyvinyl pyrrolidone, moisturizing agents such as glycerol; disintegrating agents such as agar-agar, calcium carbonate and sodium bicarbonate; dissolution retardants such as paraffin; resorption accelerators such as quaternary ammonium compounds; surface active agents such as cetyl alcohol and glycerol monostearate; adsorptive carriers such as kaolin and bentonite; and lubricants such as talc, calcium and magnesium stearate and solid polyethylene glycols.

Pharmaceutical compositions such as tablets, dragees, capsules and pills can have the customary coatings, envelopes and protective matrices, which may contain opacifiers. They can be so constituted that they release the active ingredient only or preferably in a particular part of the intestinal tract, immediately or with sustained release. The coatings, envelope and protective matrices may be made, for example, of polymeric substances or waxes. The ingredient can also be in microencapsulated form together with one or several of the above diluents.

The diluents for suppositories can be for example water-soluble or water-soluble agents, such as polyethylene glycols and fats; such as cocoa oil and higher esters, e.g. $C_{14}$-alcohol and $C_{16}$-fatty acid, and the like or mixtures of these diluents.

Ointments, pastes, creams and gels can for example contain animal and vegetable fats, waxes, paraffins, starch, tragacanth, cellulose derivatives, polyethylene glycols, silicones, bentonites, silicic acid, talc and zinc oxide or mixtures of these substances.

Powders and sprays can for example contain lactose, talc, silicic acid, aluminum hydroxide, calcium silicate, and polyamide powder or mixtures of these substances. Aerosol sprays will contain one of the usual propellants such as chlorofluorohydrocarbons.

The pharmaceutical compositions which are solutions and emulsions can for example contain the customary diluents, such as solvents, dissolving agents and emulsifiers, such as water, ethyl alcohol, isopropyl alcohol, ethyl carbonate, ethyl acetate, benzyl alcohol, benzyl benzoate, propylene glycol, 1,3-butylene glycol, dimethylformamide, oils such as ground nut oil, glycerol, tetrahydrofurfuryl alcohol, polyethylene glycols, fatty acid esters of sorbitol and the like or mixtures thereof. For parenteral administration, the solutions and emulsions should of course be sterile, and, if appropriate, blood-isotonic.

The pharmaceutical compositions which are suspensions will contain the liquid diluents, such as water, ethyl alcohol, propylene glycol, surface-active agents such as ethoxylated isostearyl alcohols, polyoxyethylene sorbite and sorbitane esters, microcrystalline cellulose, aluminum metahydroxide, bentonite, agar-agar and tragacanth or mixtures thereof.

A preferred pharmaceutical composition according to the invention which is particularly suitable for local application is a 1 wt.% solution of a compound of the invention in polyethylene glycol 400.

All the pharmaceutical compositions according to the invention can also contain coloring agents and preservatives as well as perfumes and flavoring agents; e.g. peppermint oil and eucalyptus oil, or sweetening agents such as saccharin.

Preferably pharmaceutical compositions are prepared in unit dosage form. The expression "unit dosage form" denotes compositions in which the compound is in the form of discrete portions, each containing a unit dose or a multiple or submultiple of a unit does, as for example, one, two, three or four unit does or a half, a third or a quarter of a unit dose. A unit dose is the amount of the active ingredient to be administered on one occasion and will usually be a daily dose, or a fraction thereof such as a half, a third, or a quarter of a daily dose, depending on whether the daily therapeutic regimen calls for the drug to be administered once, twice, three times, or four times a day.

The discrete portions constituting the medicament in dosage unit form can include a protective envelope. The active ingredient can be undiluted and contained in such an envelope, or can be mixed with a pharmaceutically acceptable solid or liquid diluent or carrier as set forth above. Such portions can for example be in monolithic coherent form, such as tablets, lozenges, pills, suppositories, or dragees; in wrapped or concealed form with the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

A typical daily dose for administration to an animal of a body weight of about 70 kg is from 800 to 20,000 mg., more generally 5,000 to 18,000 mg. This daily dose will normally be administered in two or more dosages over 24 hours.

The production of the above mentioned pharmaceutical compositions and medicaments is carried out by the usual method known in the art, for example by mixing the active ingredient(s) with the diluent(s) to form a pharmaceutical composition, e.g. a granulate, and then forming the composition into the medicament, e.g. tablets.

This invention further provides a method for combatting mycotic conditions in animals including humans, which comprises administering to the animal a compound of the invention alone or in admixture with a diluent or in the form of a medicament according to the invention.

It is envisaged that these active compounds will be administered perorally, parenterally (for example intramuscularly, intraperitoneally or intravenously), rectally, or topical, preferably orally or topical. Preferred pharmaceutical compositions and medicaments are therefore those adapted for oral and topical administration.

In general it has proved advantageous to administer amounts of from 20 to 200, preferably 50 to 100 mg/kg body weight twice a day to achieve effective results. Nevertheless it can at times be necessary to deviate from these dosage rates, and in particular to do so as a function of the nature and body weight of the human or animal subject to be treated, the individual reaction of this subject to the treatment, the type of formulation in which the active ingredient is administered, the mode in which the administration is carried out, the progress of the disease, and interval at which it is to be administered. Thus it may in some case suffice to use less than the above mentioned minimum dosage rate, while in other cases the upper limit mentioned must be exceeded to achieve the desired results. Where larger amounts are administered it can be advisable to divide these into several individual administrations over the course of the day.

The following examples will serve to further typify the nature of the invention without being a limitation on the scope thereof.

EXAMPLE 1

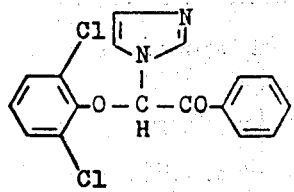

Eighteen grams (0.05 mol) of ω-bromo-[ω-2',6'-dichlorophenoxy]-acetophenone and 12 g (0.18 mol) of imidazole are dissolved in 120 ml of acetonitrile and heated for 18 hours under reflux. Thereafter the solvent is distilled off in vacuo, the residue is taken up in 150 ml of water and 3 x 40 ml of methylene chloride. The organic phase is separated off and further shaken twice with 30 ml of water at a time. The methylene chloride solution obtained is dried and the solvent is distilled off in vacuo. The oil thus obtained is taken up with ethyl acetate and treated with a solution of hydrochloric acid in ether, whereupon a crystalline precipitate is formed. This can be recrystallized from ethanol or isopropanol.

Nine grams (47% of theory) of [ω-imidazolyl]-[ω-2',6'-dichlorophenoxy]-acetophenone are obtained as the hydrochloride of melting point 218°C.

The [ω-bromo]-[ω-2',6'-dichlorophenoxy]-acetophenone (melting point 58°) used as the starting compound is obtained by condensation of ω-chloroacetophenone and 2,6-dichlorophenol. The intermediate [ω-2',6'-dichlorophenoxy]-acetophenone is brominated with bromine at 140°C. The starting compounds employed in the remaining examples can be prepared analogously.

Example 2

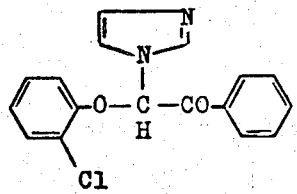

A charge of 35.25 g (0.1 mol) of [ω-bromo]-[ω-2'-chlorophenoxy]-acetophenone and 24 g (0.35 mol) of imidazole is dissolved in 240 ml of acetonitrile and boiled for 18 hours under reflux. After distilling off the solvent in vacuo, the residue is treated with 300 ml of water and the aqueous phase is extracted with methylene chloride. Thereafter the organic phase is extracted by shaking twice with 80 ml of water at a time, and is dried. The residue obtained after distilling off the solvent in vacuo crystallizes upon addition of anhydrous ether.

Twenty-two grams of [ω-imidazolyl]-[ω-2'-chlorophenoxy]-acetophenone (= 70% of theory) of melting point 95°C are obtained.

A solution of the free base in ether is treated with a solution of hydrochloric acid in ether, whereupon the hydrochloride of the product precipitates in a crystalline form. The hydrochloride of [ω-imidazolyl]-[ω-2'-chlorophenoxy]-acetophenone contains 1 mol of chemically bonded water; i.e., the keto group is present as the hydrate, and has a melting point of 171°C.

Example 3

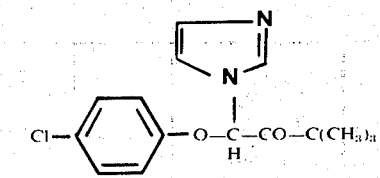

A charge of 15.25 g (0.05 mol) of 1-bromo-1-(4'-chlorophenoxy)-3,3-dimethylbutan-2-one and 12 g (0.18 mol) of imidazole is dissolved in 120 ml of acetonitrile and the solution is heated at reflux for 18 hours. After distilling off the solvent in vacuo, the residue is treated with 150 ml of water and the aqueous phase is thereafter treated three more times with 30 ml of water at a time and dried, and the solvent is distilled off in vacuo. After recrystallization of the residue from about 400 ml of ligroin, 10.5 g (72% of theory) of 1-imidazolyl-1-(4'-chlorophenoxy)-3,3-dimethylbutan-2-one of melting point 135°C are obtained.

The 1-bromo-1-(4'-chlorophenoxy)-3,3-dimethylbutan-2-one used as the starting material is obtained from 4-chlorophenol and bromopinacolone, with subsequent bromination by means of bromine at 140°C (melting point 80°C).

Examples 4 – 31

Similarly prepared are the following:

Table 2

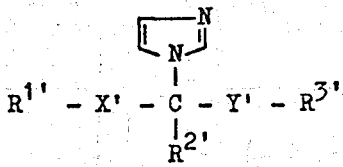

| Example | R$^{1'}$ | R$^{2'}$ | R$^{3'}$ | X' | Y' | Melting point °C |
|---|---|---|---|---|---|---|
| 4 | Cl-⟨Cl,Cl⟩ | H | ⟨⟩ | -O- | -CO- | Hydrochloride 121 Nitrate 138 |

-Continued

| Example | R$^{1'}$ | R$^{2'}$ | R$^{3'}$ | X' | Y' | Melting point °C |
|---|---|---|---|---|---|---|
| 5 | 3,4-Cl$_2$-C$_6$H$_3$- | H | 4-Cl-C$_6$H$_4$- | -O- | -CO- | 97 |
| 6 | 4-Cl-C$_6$H$_4$- | H | C$_6$H$_5$- | -O- | -C(OH)$_2$- | Hydrochloride 135 |
| 7 | 3-Cl-C$_6$H$_4$- | H | C$_6$H$_5$- | -O- | -C(OH)$_2$- | Hydrochloride 155 |
| 8 | 2-Cl-C$_6$H$_4$- | H | C$_6$H$_5$- | -O- | -C(OH)$_2$- | Hydrochloride 124 |
| 9 | 2-Cl-C$_6$H$_4$- | H | C$_6$H$_5$- | -O- | -C(OH)$_2$- | Hydrochloride 171 |
| 10 | 4-Cl-C$_6$H$_4$- | C$_6$H$_5$- | C$_6$H$_5$- | -O- | -CO- | 126 |
| 11 | 3-Cl-C$_6$H$_4$- | H | C$_6$H$_5$- | -O- | -CO- | 118 |
| 12 | 2,3-Cl$_2$-C$_6$H$_3$- | H | -C(CH$_3$)$_3$ | -O- | -CO- | 119 |
| 13 | 3,5-Cl$_2$-C$_6$H$_3$- | H | -C(CH$_3$)$_3$ | -O- | -CO- | 146 |
| 14 | 3,4-Cl$_2$-C$_6$H$_3$- | H | -C(CH$_3$)$_3$ | -O- | -CO- | 69 |
| 15 | 2-Cl-C$_6$H$_4$- | H | -C(CH$_3$)$_3$ | -O- | -CO- | 25 |
| 16 | 4-Cl-C$_6$H$_4$- | CH$_3$ | C$_6$H$_5$- | -O- | -CO- | oil |
| 17 | C$_6$H$_5$- | H | -C(CH$_3$)$_3$ | -O- | -CO- | b.p. 147°/0.01 mm |

-Continued

| Example | R¹' | R²' | R³' | X' | Y' | Melting point °C |
|---|---|---|---|---|---|---|
| 18 | Cl—C₆H₄— | H | -C(CH₃)₃ | -S- | -CO- | oil |
| 19 | Cl—C₆H₄— | H | —C₆H₅ | -S- | -CO- | oil |
| 20 | Br—C₆H₄— | H | -C(CH₃)₃ | -O- | -CO- | 106 |
| 21 | C₆H₅—C₆H₄— | H | -C(CH₃)₃ | -O- | -CO- | 104 |
| 22 | F—C₆H₄— | H | -C(CH₃)₃ | -O- | -CO- | b.p. 166°/ 0.01 mm |
| 23 | O₂N—C₆H₄— | H | -C(CH₃)₃ | -O- | -CO- | 151 |
| 24 | 2-C₆H₅-C₆H₄— | H | -C(CH₃)₃ | -O- | -CO- | 105 |
| 25 | 2-C₆H₅-3-Cl-C₆H₃— | H | -C(CH₃)₃ | -O- | -CO- | 155 |
| 26 | (CH₃)₃C—C₆H₄— | H | -C(CH₃)₃ | -O- | -CO- | 140 |
| 27 | C₆H₅— | H | —C₆H₅ | -O- | -CO- | 70 |
| 28 | 2,4-Cl₂-C₆H₃— | —C₆H₅ | -C(CH₃)₃ | -O- | -CO- | Hydrochloride |
| 29 | Cl—C₆H₄— | —C₆H₅ | -C(CH₃)₃ | -O- | -CO- | 98 - 102 |
| 30 | C₆H₅— | —C₆H₅ | -C(CH₃)₃ | -O- | -CO- | 120 - 122 |

—Continued

| Example | R¹' | R²' | R³' | X' | Y' | Melting point °C |
|---|---|---|---|---|---|---|
| 31 |  Cl-⟨phenyl⟩- | $CH_3$ | $-C(CH_3)_3$ | -O- | -CO- | oil |

What is claimed is:

1. A pharmaceutical composition useful for treating mycotic infections in humans and animals which comprises an antimycotically effective amount of an imidazole derivative of the formula:

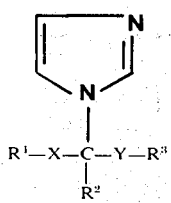

$$R^1-X-C(R^2)-Y-R^3$$

or a pharmaceutically acceptable nontoxic salt thereof, wherein $R^1$ is phenyl or phenyl substituted by from one to three members selected from the group consisting of halogen, lower alkyl, lower alkoxy, lower alkylthio, trifluoromethyl, nitro, cyano, lower alkylsulfonyl, lower alkylsulfinyl, or phenyl;

$R^3$ is lower alkyl, phenyl or phenyl substituted by from one to three members selected from the group consisting of halogen, lower alkyl, lower alkoxy, lower alkylthio, trifluoromethyl, nitro, cyano, lower alkylsulfonyl, lower alkylsulfinyl, or phenyl;

$R^2$ is hydrogen, lower alkyl, phenyl or phenyl substituted by from one to three members selected from the group consisting of halogen, lower alkyl, lower alkoxy, lower alkylthio, trifluoromethyl, nitro, cyano, lower alkylsulfonyl, lower alkylsulfinyl or phenyl;

X is —O— or —S—; and

Y is —CO— or —C(OH)$_2$—;

in combination with a pharmaceutically acceptable nontoxic inert diluent or carrier.

2. A composition according to claim 1 wherein $R^1$ is phenyl or phenyl substituted by from one to three members selected from the group consisting of halogen, lower alkyl, nitro or phenyl; $R^2$ is hydrogen, lower alkyl, phenyl or phenyl substituted by up to three halogen atoms, and $R_3$ is lower alkyl, phenyl, or phenyl substituted by up to 3 halogen atoms.

3. The composition according to claim 2 wherein the imidazole derivative is [ω-imidazolyl]-[ω-2',6'-dichlorophenoxy]-acetophenone or the hydrochloride salt thereof.

4. The composition according to claim 2 wherein the imidazole derivative is [ω-imidazolyl]-[ω-2'-chlorophenoxy]-acetophenone or the hydrochloride salt thereof.

5. The composition according to claim 2 wherein the imidazole derivative is 1-imidazolyl-1-(4'-chlorophenoxy)-3,3-dimethylbutan-2-one.

6. The composition according to claim 2 wherein the imidazole derivative is [ω-imidazolyl]-[ω-2',4', 5'-trichlorophenoxy]-acetophenone or the hydrochloride or nitrate salt thereof.

7. The composition according to claim 2 wherein the imidazole derivative is [ω-imidazolyl]-[ω-2',4'-dichlorophenoxy]-4-chloroacetophenone.

8. The composition according to claim 1 wherein the imidazole derivative is [ω-imidazolyl]-[ω-4'-chlorophenoxy]-acetophenonehydrate or the hydrochloride salt thereof.

9. The composition according to claim 1 wherein the imidazole derivative is [ω-imidazolyl]-[ω-2',4'-dichlorophenoxy]-acetophenonehydrate or the hydrochloride salt thereof.

10. The composition according to claim 1 wherein the imidazole derivative is [ω-imidazolyl]-[ω-3'-chlorophenoxy]-acetophenonehydrate or the hydrochloride salt thereof.

11. The composition according to claim 2 wherein the imidazole derivative is [ω-imidazolyl]-[ω-2'-chlorophenoxy]-acetophenonehydrate or the hydrochloride salt thereof.

12. The composition according to claim 2 wherein the imidazole derivative is [ω-imidazolyl]-[ω-phenyl]-[ω-4'-chlorophenoxy]-acetophenone.

13. The composition according to claim 2 wherein the imidazole derivative is [ω-imidazolyl]-[ω-3'-chlorophenoxy]-acetophenone.

14. The composition according to claim 2 wherein the imidazole derivative is 1-imidazolyl-1-(2',6'-dichlorophenoxy)-3,3-dimethylbutan-2-one.

15. The composition according to claim 2 wherein the imidazole derivative is 1-imidazolyl-1-(2',5'-dichlorophenoxy)-3,3-dimethylbutan-2-one.

16. The composition according to claim 2 wherein the imidazole derivative is 1-imidazolyl-1-(2',4'-dichlorophenoxy)-3,3-dimethylbutan-2-one.

17. The composition according to claim 2 wherein the imidazole derivative is 1-imidazolyl-1-(2'-chlorophenoxy)-3,3-dimethylbutan-2-one.

18. The composition according to claim 2 wherein the imidazole derivative is [ω-imidazolyl]-[ω-methyl]-[ω-4'-chlorophenoxy]-acetophenone.

19. The composition according to claim 2 wherein the imidazole derivative is 1-imidazolyl-1-phenoxy-3,3-dimethylbutan-2-one.

20. The composition according to claim 2 wherein the imidazole derivative is 1-imidazolyl-1-(4'-chlorophenylthio)-3,3-dimethylbutan-2-one.

21. The composition according to claim 2 wherein the imidazole derivative is [ω-imidazolyl]-[ω-4'-chlorophenylthio]-acetophenone.

22. The composition according to claim 2 wherein the imidazole derivative is 1-imidazolyl-1-(4'-bromophenoxy)-3,3-dimethylbutan-2-one.

23. The composition according to claim 2 wherein the imidazole derivative is 1-imidazolyl-1-(4'-biphenylyloxy)-3,3-dimethylbutan-2-one.

24. The composition according to claim 2 wherein the imidazole derivative is 1-imidazolyl-1-(4'-fluorophenoxy)-3,3-dimethylbutan-2-one.

25. The composition according to claim 2 wherein the imidazole derivative is 1-imidazolyl-1-(4'-nitrophenoxy)-3,3-dimethylbutan-2-one.

26. The composition according to claim 2 wherein the imidazole derivative is 1-imidazolyl-1-(2'-biphenylyloxy)-3,3-dimethylbutan-2-one.

27. The composition according to claim 2 wherein the imidazole derivative is 1-imidazolyl-1-(6-chloro-2-biphenylyloxy)-3,3-dimethylbutan-2-one.

28. The composition according to claim 2 wherein the imidazole derivative is 1-imidazolyl-1-(4'-tert.butylphenoxy)-3,3-dimethylbutan-2-one.

29. The composition according to claim 2 wherein the imidazole derivative is ω-imidazolyl-ω-phenoxyacetophenone.

30. The composition according to claim 2 wherein the imidazole derivative is 1-imidazolyl-1-(2',4'-dichlorophenoxy)-1-phenyl-3,3-dimethylbutan-2-one or the hydrochloride salt thereof.

31. The composition according to claim 2 wherein the imidazole derivative is 1-imidazolyl-1-(4'-chlorophenoxy)-1-phenyl-3,3-dimethylbutan-2-one.

32. The composition according to claim 2 wherein the imidazole derivative is 1-imidazolyl-1-phenoxy-1-phenyl-3,3-dimethylbutan-2-one.

33. The composition according to claim 2 wherein the imidazole derivative is 1-imidazolyl-1-(4'-chlorophenoxy)-1-methyl-3,3-dimethylbutan-2-one.

34. A composition according to claim 1 in oral administration form.

35. A composition according to claim 1 in parenteral administration form.

36. A composition according to claim 1 in topical application form.

37. A method of treating mycotic infections in humans and animals which comprises administering to said human or animal an antimycotically effective amount of an imidazole derivative of the formula:

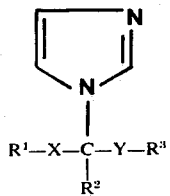

or a pharmaceutically acceptable nontoxic salt thereof, wherein $R^1$ is phenyl or phenyl substituted by from one to three members selected from the group consisting of halogen, lower alkyl, lower alkoxy, lower alkylthio, trifluoromethyl, nitro, cyano, lower alkylsulfonyl, lower alkylsulfinyl, or phenyl;

$R^3$ is lower alkyl, phenyl or phenyl substituted by from one to three members selected from the group consisting of halogen, lower alkyl, lower alkoxy, lower alkylthio, trifluoromethyl, nitro, cyano, lower alkylsulfonyl, lower alkylsulfinyl, or phenyl;

$R^2$ is hydrogen, lower alkyl, phenyl or phenyl substituted by from one to three members selected from the group consisting of halogen, lower alkyl, lower alkoxy, lower alkylthio, trifluoromethyl, nitro, cyano, lower alkylsulfonyl, lower alkylsulfinyl or phenyl;

X is —O— or —S—; and

Y is —CO— or —C(OH)$_2$.

38. A method according to claim 37 wherein
$R^1$ is phenyl or phenyl substituted by from one to three members selected from the group consisting of halogen, lower alkyl, nitro or phenyl;
$R^2$ is hydrogen, lower alkyl, phenyl or phenyl substituted by up to three halogen atoms, and
$R^3$ is lower alkyl, phenyl, or phenyl substituted by up to 3 halogen atoms.

39. A method according to claim 37 wherein the antimycotically effective amount is from 20 to 200 mg/kg twice daily.

40. A method according to claim 37 wherein the antimycotically effective amount is from 50 to 100 mg/kg twice daily.

41. A method according to claim 37 wherein the administration is oral.

42. A method according to claim 37 wherein the administration is parenteral.

43. A method according to claim 37 wherein the administration is by topical application.

44. The method according to claim 37 wherein the imidazole derivative is [ω-imidazolyl]-[ω-2',6'-dichlorophenoxy]-acetophenone or the hydrochloride salt thereof.

45. The method according to claim 37 wherein the imidazole derivative is [ω-imidazolyl]-[ω-2'-chlorophenoxy]-acetophenone or the hydrochloride salt thereof.

46. The method according to claim 37 wherein the imidazole derivative is 1-imidazolyl-1-(4'-chlorophenoxy)-3,3-dimethylbutan-2-one.

47. The method according to claim 37 wherein the imidazole derivative is [ω-imidazolyl]-[ω-2',4',5'-trichlorophenoxy]-acetophenone or the hydrochloride or nitrate salt thereof.

48. The method according to claim 37 wherein the imidazole derivative is [ω-imidazolyl]-[ω-2',4'-dichlorophenoxy]-4-chloroacetophenone.

49. The method according to claim 37 wherein the imidazole derivative is [ω-imidazolyl]-[ω-4'-chlorophenoxy]-acetophenonehydrate or the hydrochloride salt thereof.

50. The method according to claim 37 wherein the imidazole derivative is [ω-imidazolyl]-[ω-2',4'-dichlorophenoxy]-acetophenonehydrate or the hydrochloride salt thereof.

51. The method according to claim 37 wherein the imidazole derivative is [ω-imidazolyl]-[ω-3'-chlorophenoxy]-acetophenonehydrate or the hydrochloride salt thereof.

52. The method according to claim 37 wherein the imidazole derivative is [ω-imidazolyl]-[ω-2'-chlorophenoxy]-acetophenonehydrate or the hydrochloride salt thereof.

53. The method according to claim 37 wherein the imidazole derivative is [ω-imidazolyl]-[ω-phenyl]-[ω-4'-chlorophenoxy]-acetophenone.

54. The method according to claim 37 wherein the imidazole derivative is [ω-imidazolyl]-[ω-3'-chlorophenoxy]-acetophenone.

55. The method according to claim 37 wherein the imidazole derivative is 1-imidazolyl-1-(2',6'-dichlorophenoxy)-3,3-dimethylbutan-2-one.

56. The method according to claim 37 wherein the imidazole derivative is 1-imidazolyl-1-(2',5'-dichlorophenoxy)-3,3-dimethylbutan-2-one.

57. The method according to claim 37 wherein the imidazole derivative is 1-imidazolyl-1-(2',4'-dichlorophenoxy)-3,3-dimethylbutan-2-one.

58. The method according to claim 37 wherein the imidazole derivative is 1-imidazolyl-1-(2'-chlorophenoxy)-3,3-dimethylbutan-2-one.

59. The method according to claim 37 wherein the imidazole derivative is [ω-imidazolyl]-[ω-methyl]-[ω-4'-chlorophenoxy]-acetophenone.

60. The method according to claim 37 wherein the imidazole derivative is 1-imidazolyl-1-phenoxy-3,3-dimethylbutan-2-one.

61. The method according to claim 41 wherein the imidazole derivative is 1-imidazolyl-1-(4'-chlorophenylthio)-3,3-dimethylbutan-2-one.

62. The method according to claim 37 wherein the imidazole derivative is [ω-imidazolyl]-[ω-4'-chlorophenylthio]-acetophenone.

63. The method according to claim 37 wherein the imidazole derivative is 1-imidazolyl-1-(4'-bromophenoxy)-3,3-dimethylbutan-2-one.

64. The method according to claim 37 wherein the imidazole derivative is 1-imidazolyl-1-(4'-biphenylyloxy)-3,3-dimethylbutan-2-one.

65. The method according to claim 37 wherein the imidazole derivative is 1-imidazolyl-1-(4'-fluorophenoxy)-3,3-dimethylbutan-2-one.

66. The method according to claim 37 wherein the imidazole derivative is 1-imidazolyl-1-(4'-nitrophenoxy)-3,3-dimethylbutan-2-one.

67. The method according to claim 37 wherein the imidazole derivative is 1-imidazolyl-1-(2'-biphenylyloxy)-3,3-dimethybutan-2-one.

68. The method according to claim 37 wherein the imidazole derivative is 1-imidazolyl-1-(6-chloro-2-biphenylyloxy)-3,3-dimethylbutan-2-one.

69. The method according to claim 37 wherein the imidazole derivative is 1-imidazolyl-1-(4'-tert.butylphenoxy)-3,3-dimethylbutan-2-one.

70. The method according to claim 37 wherein the imidazole derivative is ω-imidazolyl-ω-phenoxyacetophenone.

71. The method according to claim 37 wherein the imidazole derivative is 1-imidazolyl-1-(2',4'-dichlorophenoxy)-1-phenyl-3,3-dimethylbutan-1-one or the hydrochloride salt thereof.

72. The method according to claim 37 wherein the imidazole derivative is 1-imidazolyl-1-(4'-chlorophenoxy)-1-phenyl-3,3-dimethylbutan-2-one.

73. The method according to claim 37 wherein the imidazole derivative is 1-imidazolyl-1-phenoxy-1-phenyl-3,3-dimethylbutan-2-one.

74. The method according to claim 37 wherein the imidazole derivative is 1-imidazolyl-1-(4'-chlorophenoxy)-1-methyl-3,3-dimethylbutan-2-one.

* * * * *